US006187899B1

(12) United States Patent
Asao et al.

(10) Patent No.: US 6,187,899 B1
(45) Date of Patent: Feb. 13, 2001

(54) POLYAMIC ACID AND POLYIMIDE MICROFINE PARTICLES AND PROCESS FOR THEIR PRODUCTION

(75) Inventors: Katsuya Asao, Sakai; Hidenori Saito, Yokohama, both of (JP)

(73) Assignees: Osaka Prefectural Government, Osaka; Sumitomo Bekelite Co., Ltd., Tokyo, both of (JP)

( * ) Notice: Under 35 U.S.C. 154(b), the term of this patent shall be extended for 0 days.

(21) Appl. No.: 09/257,234

(22) Filed: Feb. 25, 1999

(30) Foreign Application Priority Data

Aug. 28, 1998 (JP) .................................................. 10-259510

(51) Int. Cl.⁷ ............................ C08G 73/10; C08G 69/26
(52) U.S. Cl. .......................... 528/332; 528/125; 528/126; 528/128; 528/170; 528/172; 528/173; 528/179; 528/183; 528/185; 528/188; 528/220; 528/229; 528/350; 528/353
(58) Field of Search ..................................... 528/332, 125, 528/126, 128, 170, 172, 173, 179, 183, 185, 188, 220, 229, 350, 353

(56) References Cited

U.S. PATENT DOCUMENTS

| 3,607,838 | 9/1971 | Strickrodt | 260/78 |
| 4,098,800 | 7/1978 | Banucci et al. | 549/241 |

FOREIGN PATENT DOCUMENTS

| 57200453 | 8/1982 | (JP) . |
| 61-45651 | 10/1986 | (JP) . |

OTHER PUBLICATIONS

*Translation of Article in The Chemical Daily dated Mar. 14, 1997.* Tri Osaka Develops New Process for Producing Uniform Polyimide Microfine Particles Having Diameter of 1 $\mu$m or Less and Unaffected Heat Resistance. pp. 1–2.

*Primary Examiner*—P. Hampton-Hightower
(74) *Attorney, Agent, or Firm*—Armstrong, Westerman, Hattori, McLeland & Naughton

(57) ABSTRACT

A process for producing polyimide microfine particles which is amenable to free control of particle morphology and particle diameter distribution is provided. A polyamic acid and a polyimide, each in the form of microfine particles with good monodispersibility, are also provided. There is also provided a process for producing polyimide microfine particles from a tetracarboxylic anhydride and a diamine compound which comprises (a) a first step of preparing a first solution containing the tetracarboxylic anhydride and a second solution containing the diamine compound, (b) a second step of mixing the first and second solutions and causing a polyamic acid to precipitate in the form of microfine particles from the mixed solution under ultrasonic agitation, and (c) a third step of imidating the polyamic acid particles to provide the objective polyimide in the form of microfine particles.

14 Claims, 1 Drawing Sheet

DPE/BTDA Polyamic acid

DPE/BTDA Polyimide

POLYAMIC ACID AND POLYIMIDE MICROFINE PARTICLES AND PROCESS FOR THEIR PRODUCTION

FIELD OF THE INVENTION

This invention relates to novel polyamic acid microfine particles and polyimide microfine particles and to a technology for producing them.

BACKGROUND OF THE INVENTION

Polyimides are not only favorable in mechanical properties but also satisfactory in other properties such as heat resistance, resistance to chemicals, and electric insulating properties and have, therefore, been used broadly as electrical/electronic materials, car component materials, and substitutes for metals and ceramics, among other applications.

The conventional process for synthesizing a polyimide comprises reacting a tetracarboxylic dianhydride with a diamine in a solvent such as N,N-dimethylformamide (DMF) to give a polyamic acid which is a precursor of the objective polyimide in the form of a varnish, and subjecting this varnish to precipitation to provide the objective polyimide as fine particles.

However, this technology has the drawback that the polyimide particles separating out with the progress of polymerization reaction undergo coalescence/coagulation, thus failing to give a monodispersed polyimide system.

An alternative technology comprises polymerizing a tetracarboxylic dianhydride with an organic diamine in an organic solvent under heating to give a polyamic acid solution, pouring this solution in a poor solvent for the polymer, recovering the resulting precipitate, and subjecting it to thermal cyclization reaction to provide the objective polyimide.

However, when polyimide microfine powder is to be produced by this technology, the polymer block must be recovered after the imidation reaction and mechanically pulverized, thus introducing a complicating factor into the production process. Moreover, mechanical pulverization yields only more or less coarse particles and can hardly provide a monodispersed system of discrete particles. In addition, the above technology does not lend itself well to the control of particle morphology and size distribution.

Thus, there has been a standing demand for development of a technology for producing polyimide microfine powder capable of providing a monodispersed system.

SUMMARY OF THE INVENTION

With a view to overcoming the above drawbacks of the prior art, the inventors of this invention explored in earnest for a way to meet the demand and discovered that the demand can be satisfied by using a process including a certain procedure herein defined. This invention has been developed on the basis of the above finding.

This invention, therefore, is directed to a process for producing polyamic acid microfine particles from a tetracarboxylic anhydride and a diamine compound, said process being characterized by comprising (a) a first step which comprises preparing a first solution containing said tetracarboxylic anhydride and a second solution containing said diamine compound, respectively, and (b) a second step which comprises mixing said first and second solutions under constant ultrasonic agitation to let polyamic acid microfine particles precipitate from the mixed solution (first invention).

This invention is further directed to a process for producing polyimide microfine particles from a tetracarboxylic anhydride and a diamine compound, said process being characterized by comprising (a) a first step which comprises preparing a first solution containing said tetracarboxylic anhydride and a second solution containing said diamine compound, respectively, (b) a second step which comprises mixing said first and second solutions under constant ultrasonic agitation to let polyamic acid microfine particles precipitate from the mixed solution, and (c) a third step which comprises subjecting said polyamic acid microfine particles to imidation reaction to thereby produce polyimide microfine particles (second invention).

This invention is further directed to polyamic acid microfine particles having an average particle diameter of 0.03–0.7 $\mu$m as obtainable by the above process for producing polyamic acid microfine particles (third invention).

The invention is further directed to polyimide microfine particles having an average particle diameter of 0.03–0.7 $\mu$m as obtainable by the above process for producing polyimide microfine particles (fourth invention)

DETAILED DESCRIPTION OF THE INVENTION

Figure 1:
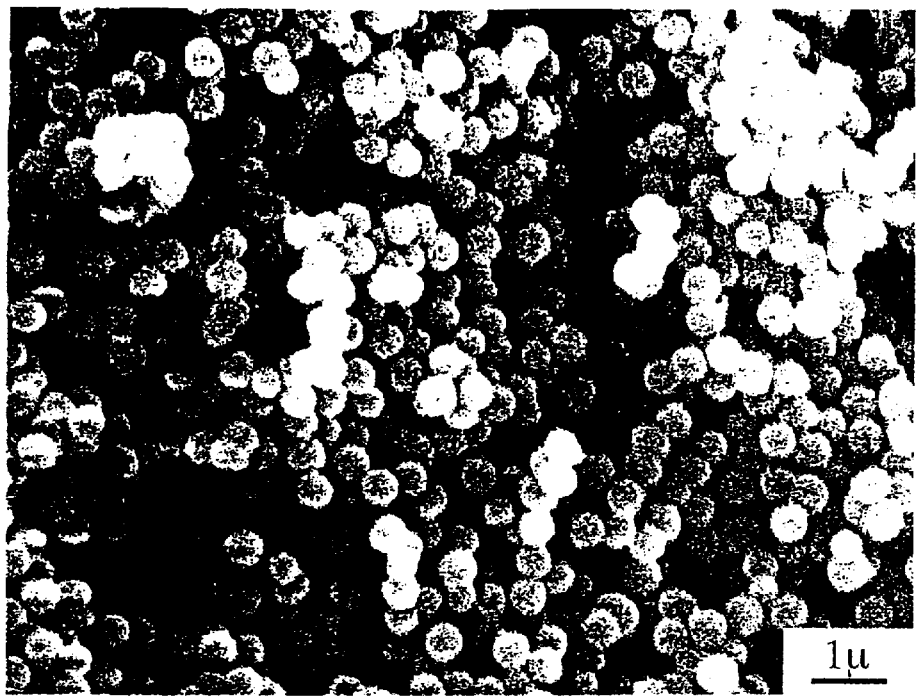
FIG. 1 is an image drawing of the polyamic acid microfine particles obtained in Example 1.

It should be understood, in the first place, that the first and second steps of said second invention are identical with the first and second steps, respectively, of said first invention. Those respective steps are now described in detail.

(1) First Step

In accordance with this invention, a tetracarboxylic anhydride and a diamine compound are used as starting materials to produce polyamic acid microfine particles. In the first step, a first solution containing said tetracarboxylic anhydride and a second solution containing said diamine compound are respectively prepared. Thus, it is essential, in the practice of this invention, that the tetracarboxylic anhydride and diamine compound be first provided as independent solutions.

(a) First solution

The tetracarboxylic anhydride for said first solution is not particularly restricted but includes those compounds which are conventionally used in polyimide synthesis. Thus, it includes but is not limited to aromatic tetracarboxylic anhydrides such as 3,3',4,4'-benzophenonetetracarboxylic dianhydride (BTDA), 3,3',4,4'-biphenyltetracarboxylic dianhydride, 2,3,3',4'-biphenyltetracarboxylic dianhydride, piromellitic dianhydride, 1,3-bis(2,3-dicarboxyphenoxy) benzene dianhydride, 1,4-bis(2,3-dicarboxyphenoxy) benzene dianhydride, 2,3,3',4'-benzophenonetetracarboxylic dianhydride, 2,2',3,3'-benzophenonetetracarboxylic dianhydride, 2,2',3,3'-biphenyltetracarboxylic dianhydride, 2,2',6,6'-biphenyltetracarboxylic dianhydride, naphthalene-1,2,4,5-tetracarboxylic dianhydride, anthracene-2,3,6,7-tetracarboxyllc dianhydride, phenanthrene-1,8,9,10-tetracarboxylic dianhydride, etc.; aliphatic tetracarboxylic acid anhydrides such as butane-1,2,3,4-tetracarboxylic dianhydride etc.; alicyclic tetracarboxylic anhydrides such as cyclobutane-1,2,3,4-tetracarboxylic dianhydride etc.; and heterocyclic tetracarboxylic anhydrides such as thiophene-2,3,4,5-tetracarboxylic anhydride, pyridine-2,3,5,6-tetracarboxylic anhydride, etc. Those compounds can be used each independently or in a combination of 2 or more species. For the purposes of the invention, BTDA and pyromellitic dianhydride are particularly preferred.

Furthermore, this invention can be reduced to practice by using a tetracarboxylic anhydride partially substituted by acid chloride. Such substitution with acid chloride may result in the benefits of increased reaction rate and further reduction in the particle diameter. As the acid chloride, diethyl pyromellitate diacyl chloride, for instance, can be used.

The solvent for use in the preparation of said first solution is not particularly restricted only if the tetracarboxylic anhydride is substantially soluble therein while the reaction product polyamic acid is insoluble. Thus, for example, 2-propanone, 3-pentanone, tetrahydropyrene, epichlorohydrin, acetone, methyl ethyl ketone (MEK), tetrahydrofuran (THF), ethyl acetate, acetanilide, methanol, ethanol, isopropyl alcohol, toluene, and xylene can be mentioned. Thus, a solvent comprising at least one of those solvent species can be used.

Usable are even those solvents in which the polyamic acid is soluble, for example aprotic polar organic solvents such as N,N-dimethylformamide (DMF), N,N-dimethylacetamide (DMAc), N-metyl-2-pyrrolidone (NMP), etc. if they are mixed beforehand with a poor solvent for the polyamic acid, such as acetone, ethyl acetate, MEK, toluene, xylene, etc., or otherwise preadjusted so that the polyamic acid will be precipitated therefrom.

The concentration of the tetracarboxylic anhydride in the first solution can be judiciously selected according to the species of tetracarboxylic anhydride and the concentration of the second solution, among other factors, but is generally 0.001–0.20 mol/l and preferably about 0.01–0.10 mol/l.

(b) Second solution

The diamine compound for use in the preparation of said second solution is not particularly restricted but includes those compounds which are conventionally used In polyimide synthesis. For example, it may be any of aromatic diamines such as 4,4'-diaminodiphenylmethane (DDM), 4,4'-diaminodiphenyl ether (DPE), 4,4'-bis(4-aminophenoxy)biphenyl (BAPB), 1,4'-bis(4-aminophenoxy)benzene (TPE-Q), 1,3'-bis(4-aminophenoxy)benzene (TPE-R), o-phenylenediamine, m-phenylenediamine, p-phenylenediamine, 3,4'-diaminodiphenyl ether, 4,4'-diaminodiphenyl sulfone, 3,4-diaminodiphenyl sulfone, 3,3'-diaminodiphenyl sulfone, 4,4'-methylene-bis(2-chloroaniline), 3,3'-dimethyl-4,4'-diaminobiphenyl, 4,4'-diaminodiphenyl sulfide, 2,6'-diaminotoluene, 2,4-diaminochlorobenzene, 1,2-diaminoanthraquinone, 1,4-diaminoanthraquinone, 3,3'-diaminobenzophenone, 3,4-diaminobenzophenone, 4,4'-diaminobenzophenone, 4,4'-diaminobibenzyl, R(+)-2,2'-diamino-1,1'-binaphthalene, S(+)-2,2'-diamino-1,1'-binaphthalene, etc.; aliphatic diamines such as 1,2-diaminomethane, 1,4-diaminobutane, tetramethylenediamine, 1,10-diaminododecane, etc.; alicyclic diamines such as 1,4-diaminocyclohexane, 1,2-diaminocyclohexane, bis(4-aminocyclohexyl)methane, 4,4'-diaminodicyclohexylmethane, etc.; 3,4-diaminopyridine, 1,4-diamino-2-butanone, etc. Those diamine compounds can be used each alone or in a combination of 2 or more species.

In the practice of this invention, DPE or TPE-R, for instance, is used with particular advantage.

In addition to such diamine compounds, other amine compounds (monoamines and polyamines) can be used in the practice of this invention. By so doing, the characteristics of the product polyamic acid or polyimide can be modified as desired.

The solvent for use in the preparation of said second solution is not particularly restricted only if the diamine compound is substantially soluble therein while the product polyamic acid is insoluble. Thus, for example, 2-propanone, 3-pentanone, tetrahydropyrene, epichlorohydrin, acetone, methyl ethyl ketone (MEK), tetrahydrofuran (THF), ethyl acetate, acetanilide, methanol, ethanol, and isopropyl alcohol can be mentioned and those solvents can be used each alone or in a combination of 2 or more species.

Moreover, even those solvents in which the polyamic acid is soluble, for example aprotic polar organic solvents such as DMF, DMAc, NMP, etc. can also be used if they are previously mixed with a poor solvent for the polyamic acid, such as acetone, ethyl acetate, MEK, toluene, xylene, etc., or otherwise adjusted beforehand so that the polyamic acid will be precipitated therefrom.

The concentration of the diamine compound in the second solution can be judiciously selected according to the species of diamine compound and the concentration of the first solution, among other factors, but is generally about 0.001–0.20 mol/l and preferably 0.01–0.10 mol/l.

(2) Second Step

In the second step, the first solution is combined with the second solution and polyamic acid microfine particles are allowed to precipitate from the mixed solution under constant ultrasonic agitation. The blending ratio of the first solution to the second solution can be adjusted according to the species of tetracarboxylic anhydride and diamine compound and the concentrations of the respective solutions but it is recommendable to blend them in a tetracarboxylic anhydride:diamine compound ratio (molar ratio) of generally about 1:0.5–1.5 and preferably 1:0.9–1.1.

In the second step, the polyamic acid microfine particles are caused to precipitate under ultrasonic agitation. This ultrasonic agitation enables micronization down to about 50% in mean particle diameter as compared with the usual stirring method. Moreover, microfine particles are more uniform in particle diameter than those obtainable by the usual stirring method can be provided. For this ultrasonic agitation, the known ultrasonic equipment (e.g. an ultrasonic cleaner) and operating conditions can be used. The frequency of ultrasonic waves can be judiciously set according to the desired particle diameter and other parameters and is usually about 28–100 kHz and preferably 28–45 kHz.

The temperature at which the second step is carried out is not particularly restricted but may range generally from about 0° C. to 130° C. and preferably from 20° C. to 40° C. The agitation is continued until precipitation of the polyamic acid has substantially gone to completion and its duration is generally about 30 seconds to 30 minutes, although the range is not critical.

The polyamic acid microfine particles which have precipitated out in the second step can be recovered by known solid-liquid separation means such as centrifugation. When the polyamic acid microfine particles produced in the second step consist of spherical particles, they generally form a monodispersed system with an average particle diameter of 0.03–0.7 $\mu$m (preferably 0.03–0.55 $\mu$m), a standard deviation(SD) of 0.02–0.07 (preferably 0.02–0.055), and a coefficient of variation (CV) within the range of 3–15%

(preferably 3–9%). When the microfine particles are formless, the mean particle size is generally about 0.5–1.0 μm.

(3) Third Step

In the third step, the polyamic acid microfine particles obtained in the second step are imidated to polyimide microfine particles. The imidation technology is not particularly restricted only if polyimide microfine particles can be directly obtained from the polyamic acid microfine particles but, in this invention, it is preferable to use (i) the imidation method which comprises heating the polyamic acid microfine particles in an organic solvent (thermal cyclization) or (ii) the method of imidation by chemical reaction in an organic solvent (chemical cyclization).

The first-mentioned thermal method (i) typically comprises dispersing the polyamic acid microfine particles in an organic solvent and heating the dispersion generally at a temperature not below 130° C. and preferably at about 130–250° C. The organic solvent is not particularly restricted only if it is a poor solvent for the polyamic acid and having a boiling point over the imidation reaction temperature. Particularly in this invention, the organic solvent preferably comprises a solvent capable of forming an azeotropic mixture with water (hereinafter referred to sometimes as azeotropic solvent). Thus, this invention is preferably reduced to practice using a solvent consisting, either in part or exclusively, of said azeotropic solvent. The azeotropic solvent which can be used includes but is not limited to xylene, ethylbenzene, octane, cyclohexane, diphenyl ether, nonane, pyridine, and dodecane. Those solvents can be used each alone or as a mixture of 2 or more species. In the practice of this invention, such an azeotropic solvent preferably accounts for at least 10 volume t of said organic solvent. Since the use of an azeotropic solvent enables azeotropic removal of byproduct water (mostly the water produced by condensation) by refluxing or the like, not only the hydrolysis of unreacted amide bonds can be inhibited but also the morphological deformation and molecular weight decrease can be inhibited, with the result that polyimide microfine particles capable of forming a monodispersed system are more positively obtained.

The proportion of the polyamic acid microfine particles to be dispersed in the organic solvent can be judiciously selected according to the kind of organic solvent, among other factors, but is generally about 1–50 g/l and preferably 5–10 g/l.

The latter chemical reaction method (ii) can be carried into practice by the known chemical cyclization technology. A typical process comprises dispersing the polyamic acid microfine particles in an organic solvent consisting of pyridine and acetic anhydride and heating the dispersion under constant agitation generally at a temperature of about 15–115° C. for about 24 hours. The proportions of the two component solvents can be optimized for each production.

The polyimide microfine particles produced in the third step can be recovered by a known procedure and washed with an organic solvent such as petroleum ether, methanol, acetone, or the like.

When the polyimide microfine particles obtained by the technology of this invention consist of spherical particles, they generally form a monodispersed system with an average particle diameter of 0.03–0.7 μm (preferably 0.03–0.55 μm), a standard deviation of 0.02–0.07 (preferably 0.02–0.055), and a coefficient of variation within the range of 3–15% (preferably 3–12%). When they consist of formless solid particles, the mean size is generally about 0.1–1.0 μm. The particle morphology of the polyimide microfine particles usually traces back to the morphology of the polyamic acid microfine particles and may assume the spherical, formless or other form.

In the production process according to the second invention, polyimide microfine particles showing neither a glass transition temperature (Tg) nor a melting temperature (Tm) are formed depending upon the combination of said tetracarboxylic anhydride and diamine compound. Thus, in accordance with this invention, even straight-chain, non-thermoplastic polyimide microfine particles can be produced. Moreover, when such a combination as above is used in the process according to the first invention, too, polyamic acid microfine particles ultimately giving such straight-chain, non-thermoplastic polyimide microfine particles can be obtained. The conditions other than said combination may be the same as those described for the first invention and the second invention.

The combination mentioned above is not particularly restricted only if the product polyimide (microfine particles) has neither a glass transition temperature (Tg) nor a melting temperature (Tm). Moreover, only provided that the product polyimide has neither Tg nor Tm, it may be a combination of two or more species for each reactant. The proportions of said tetracarboxylic anhydride and diamine compound can be in the same range as mentioned hereinbefore.

The combination, thus, includes but is not limited to (1) the combination of p-phenylenediamine with pyromellitic dianhydride, (2) the combination of p-phenylenediamine with 3,3'-BTDA, (3) the combination of o-phenylenediamine with pyromellitic dianhydride, (4) the combination of 4,4'-diaminodiphenyl sulfide with pyromellitic dianhydride, (5) the combination of p-phenylenediamine with 3,3',4,4'-biphenyltetracarboxylic dianhydride, (6) the combination of p-phenylenediamine and o-phenylenediamine with pyromellitic dianhydride, (7) the combination of p-phenylenediamine and o-phenylenediamine with 3,3',4,4'-biphenyltetracarboxylic dianhydride, (8) the combination of p-phenylenediamine and 4,4'-diaminodiphenyl sulfide with pyromellitic dianhydride, (9) the combination of p-phenylenediamine and 4,4'-diaminodiphenyl sulfide with 3,3',4,4'-biphenyltetracarboxylic dianhydride, (10) the combination of p-phenylenediamine, o-phenylenediamine and 4,4'-diaminodiphenyl sulfide with pyromellitic dianhydride, (11) the combination of p-phenylenediamine, o-phenylenediamine and 4,4'-diaminodiphenyl sulfide with 3,3',4,4'-biphenyltetracarboxylic dianhydride, (12) the combination of p-phenylenediamine with pyromellitic dianhydride and 3,3',4,4'-biphenyltetracarboxylic dianydride, (13) the combination of o-phenylenediamine with pyromellitic dianhydride and 3,3',4,4'-biphenyltetracarboxylic dianhydride, (14) the combination of 4,4'-diaminodiphenyl sulfide with 3,3'-4,4'-biphenyltetracarboxylic dianhydride and pyromellitic dianhydride, and (15) the combination of 4,4'-diaminodiphenyl sulfide and p-phenylenediamine with pyromellitic dianhydride and 3,3',4,4'-biphenyltetracarboxylic dianhydride.

When the straight-chain, non-thermoplastic polyimide microfine particles obtained by the above process of this invention consist of spherical particles, they generally form a monodispersed system with an average particle diameter of 0.03–0.7 μm (preferably 0.03–0.55 μm), a standard deviation of 0.02–0.07 (0.02–0.055), and a coefficient of variation within the range of 3–15% (3–12%). When they are formless particles, the mean size of individual particles is generally about 0.1–1.0 μm. The particle morphology of the polyimide microfine particles generally traces back to the morphology of the polyamic acid microfine particles and may assume the spherical, formless or other form.

By the process of this invention, a monodispersed system of fine and uniform polyimide particles with an average particle diameter of not greater than 1 μm (generally not greater than 0.7 μm, particularly 0.55 μm) can be provided with comparative ease. Moreover, in the process of this invention, the mean particle diameter, morphology and diameter distribution can also be controlled with comparative ease by modifying the process parameter values in a judicious manner.

The polyimide microfine particles obtainable by the process of this invention have the heat resistance, electrical insulating and other inherent characteristics of polyimide resin intact and, therefore, finds application in a broad spectrum of uses including the conventional uses, particularly as coating materials for electrically insulating parts, molding fillers, electric/electronic materials such as liquid crystal spacers etc., and even various composite materials.

Furthermore, by the process of this invention, not only straight-chain, thermoplastic polyimide microfine particles but also straight-chain, non-thermoplastic polyimide microfine particles can be manufactured. The straight-chain, non-thermoplastic polyimide microfine particles are insoluble and infusible, having neither Tg nor Tm, so that they show a laudable performance particularly in physical terms such as heat resistance and durability. In other respects, it has properties basically similar to those described above for the polyamic acid microfine particles and polyimide microfine particles.

EXAMPLES

The following examples are intended to further describe the outstanding features of the invention. In the examples, the ultrasonic agitation was carried out using "Ultrasonic Cleaner CA-2481 II" (Kaijo Electric Machinery Co.). The physical properties relevant to this invention were determined by the following methods.

(1) Glass transition temperature etc.

Glass transition temperature (Tg), melting temperature (Tm) and decomposition temperature (Td) were determined by differential scanning calorimetry (DSC). The measuring conditions were: temperature incremental rate 20° C./min. and nitrogen 50 ml/min.

(2) Mean particle diameter etc.

The mean particle diameter of the particles was determined using a scanning electron microscope (SEM). Thus, 100 particles were randomly selected on the SEM photograph and the mean diameter of those particles was calculated by means of the following equation (1).

$$X = (1/n)\Sigma Xi \quad (1)$$

(n:number of measured data, Xi:measured value)

Based on the mean particle diameter value, the standard deviation (S) was calculated by means of the following expressions (2) and (3) and the coefficient of variation (C) by means of the following expression (4). The smaller the coefficient of variation is, the smaller the degree of scattering of particle diameter values is. The mean particle diameter values and coefficients of variation shown hereinafter were determined in the same manner.

$$S^2 = [1/(1-n)](\Sigma Xi^2 - X \cdot \Sigma Xi) \quad (2)$$

$$S = (S^2)^{1/2} \quad (3)$$

$$C = (S/X) \times 100(\%) \quad (4)$$

Example 1

In the first place, a first solution (50 ml) was prepared by dissolving 0.002 mol of BTDA in acetone (BTDA/acetone= 0.002 mol/50 ml; the same expression mode applies below) and a second solution was prepared by dissolving DPE in acetone (DPE/acetone=0.002 mol/50 ml).

These two solutions were combined at 25° C. and reacted under ultrasonic agitation at a frequency of 38 kHz for 10 minutes to let polyamic acid precipitate. This polyamic acid was observed with a scanning electron microscope (SEM) and confirmed to be uniform, spherical microfine particles forming a monodispersed system. The image drawing is presented in FIG. 1. The polyamic acid microfine particles had a mean particle diameter of 0.499 μm with a standard deviation of 0.0295, the coefficient of variation being 5.912%.

Figure 2:
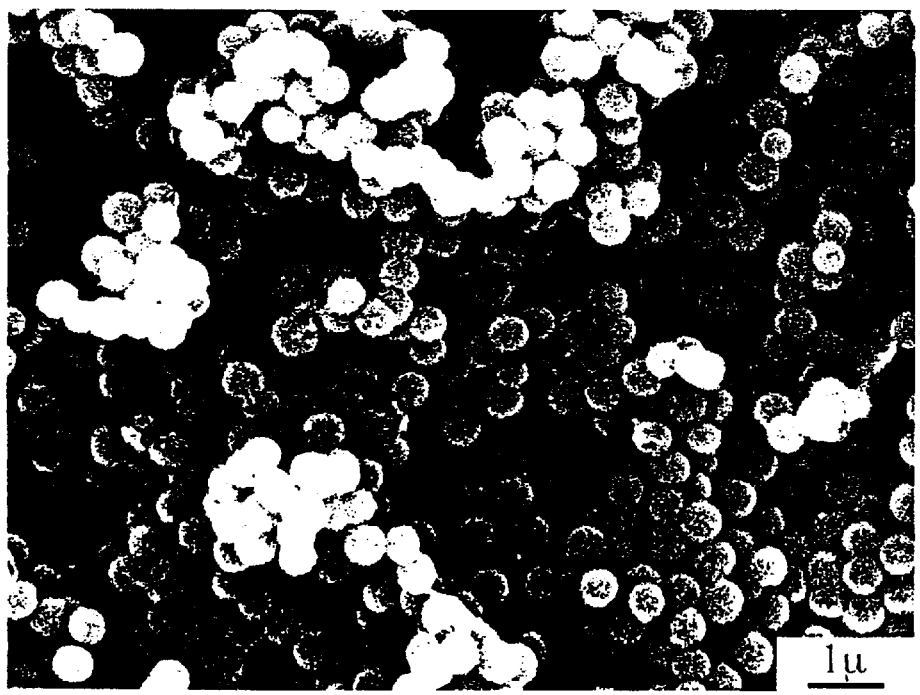
FIG. 2 is an image drawing of the polyimide microfine particles obtained in Example 1.

One gram of the polyamic acid microfine particles recovered was dispersed in 200 ml of xylene and the imidation reaction was carried out by refluxing the dispersion at 140° C. for about 4 hours. The resulting polyimide was observed by SEM. As a result, it was confirmed that the polyimide also consisted of uniform, spherical microfine particles forming a monodispersed system. The image drawing is presented in FIG. 2. The polyimide microfine particles had a mean particle diameter of 0.506 μm with a standard deviation of 0.0268, the coefficient of variation being 5.285%. The glass transition temperature (Tg) and decomposition temperature [Td (5 wt % loss)] were 329° C. and 532° C., respectively.

Example 2

A first solution of BTDA/acetone=0.002 mol/50 ml and a second solution of BAPB/acetone=0.002 mol/50 ml were first prepared.

The two solutions were combined at 25° C. and reacted under ultrasonic agitation at a frequency of 38 kHz for 10 minutes to let polyamic acid precipitate. This polyamic acid was observed with a scanning electron microscope (SEM) and confirmed to be consisting of formless microfine particles. The mean size of those formless particles was not greater than 0.5 μm.

One gram of the recovered polyamic acid microfine particles was dispersed in 200 ml of xylene and the imidation reaction was carried out by refluxing the dispersion at 140° C. for about 4 hours. The resulting polyimide was observed with a SEM and, as a result, it was confirmed that the polyimide consisted of formless microfine particles and had a mean size of not greater than 0.5 μm. The Tg and Td values were 286° C. and 484° C., respectively.

Example 3

A first solution of BTDA/acetone=0.02 mol/50 ml and a second solution of TPE-Q/acetone=0.02 mol/50 ml were first prepared.

The two solutions were combined at 25° C. and reacted under ultrasonic agitation at a frequency of 38 kHz for 10 minutes to let polyamic acid precipitate. This polyamic acid was observed with a scanning electron microscope (SEM) and confirmed to be uniform, spherical microfine particles forming a monodispersed system. The polyamic acid microfine particles had a mean particle diameter of 0.46 μm with a standard deviation of 0.032, the coefficient of variation being 7.2%.

One gram of the polyamic acid microfine particles recovered was dispersed in 200 ml of xylene and the imidation reaction was carried out by refluxing the dispersion at 140° C. for about 4 hours. The resulting polyimide was observed with a SEM and, as a result, it was confirmed to be uniform, spherical microfine particles forming a monodispersed system. The polyimide microfine particles had a mean particle diameter of 0.46 μm with a standard deviation of 0.041, the coefficient of variation being 8.9%. The Tg and Td values were 291° C. and 531° C., respectively.

Example 4

A first solution of BTDA/acetone=0.02 mol/50 ml and a second solution of TPE-R/acetone=0.02 mol/50 ml were first prepared.

The two solutions were combined at 25° C. and reacted under ultrasonic agitation at a frequency of 38 kHz for 10 minutes to let polyamic acid precipitate. This polyamic acid was observed with a scanning electron microscope (SEM) and confirmed to be uniform, spherical microfine particles forming a monodispersed system. The polyamic acid microfine particles had a mean particle diameter of 0.62 μm with a standard deviation of 0.041, the coefficient of variation being 8.9%.

One gram of the polyamic acid microfine particles recovered was dispersed in 200 ml of xylene and the imidation reaction was carried out by refluxing the dispersion at 140° C. for about 4 hours. The resulting polyimide was observed with a SEM and, as a result, it was confirmed to be uniform, spherical microfine particles forming a monodispersed system. The polyimide microfine particles had a mean particle diameter of 0.60 pm with a standard deviation of 0.054, the coefficient of variation being 11.7%. The Tg and Td values were 247° C. and 545° C., respectively.

Test Example 1

In the second step of the process of the invention, any difference in results due to different methods of agitation was investigated.

Using low-speed agitation with a magnetic stirrer (10 rpm) in lieu of ultrasonic agitation, the procedure of Example 1 was otherwise repeated to prepare polyamic acid particles, which was then imidated as in Example 1 to provide polyimide particles.

The polyamic acid particles and polyimide particles obtained in the above manner were compared with the corresponding particles obtained in Example 1. The data are presented in Table 1 (low-speed agitation) and Table 2 (ultrasonic agitation).

TABLE 1

|  | Polyamic acid particles | Polyimid particles |
| --- | --- | --- |
| Morphology | Spherical (beads) | Spherical (beads) |
| Mean | 0.667 μm | 0.668 μm |
| SD | 0.0415 | 0.0509 |
| CV | 6.228% | 7.621% |
| Min | 0.542 μm | 0.525 μm |
| Max | 0.736 μm | 0.775 μm |

TABLE 2

|  | Polyamic acid particles | Polyimide particles |
| --- | --- | --- |
| Morphology | Spherical (beads) | Spherical (beads) |
| Mean | 0.499 μm | 0.506 μm |
| SD | 0.0295 | 0.0268 |
| CV | 5.918% | 5.284% |
| Min | 0.410 μm | 0.447 μm |
| Max | 0.537 μm | 0.553 pm |

It will be clear from Tables 1 and 2 that the particles obtained by ultrasonic agitation are smaller (mean) and more uniform in particle diameter distribution with better monodispersibility than those obtained by said low-speed agitation.

Test Example 2

In the second step of the process of the invention, any difference in results due to different methods of agitation was investigated.

Using high-speed agitation (380 rpm) with the stirrer for chemical synthesis in lieu of ultrasonic agitation, the procedure of Example 1 was otherwise repeated to prepare polyamic acid particles, which was then imidated as in Example 1 to provide polyimide particles. The characteristics of the particles are presented in Table 3.

TABLE 3

|  | Polyamic acid particles | Polyimide particles |
| --- | --- | --- |
| Morphology | Spherical (beads) | Spherical (beads) |
| Mean | 0.652 μm | 0.608 μm |
| SD | 0.0082 | 0.0091 |
| CV | 8.967% | 10.526% |
| Min | 0.449 μm | 0.488 μm |
| Max | 0.780 μm | 0.731 μm |

Comparison of the data in Table 3 with the data in Table 2 shows clearly that the microfine particles obtained by ultrasonic agitation according to the invention are finer and form a superior monodispersed system.

Example 5

In the first place, a first solution of pyromellitic dianhydride/acetone=0.002 mol/50 ml and a second solution of p-phenylenediamine/acetone=0.002 mol/50 ml were respectively prepared.

The two solutions were combined at 25° C. and reacted under ultrasonic agitation at a frequency of 38 kHz for 10 minutes, whereupon the polyamic acid precipitate. The polyamic acid thus obtained was observed with a scanning electron microscope (SEM) and, as a result, it was confirmed to be uniform, spherical microfine particles forming a mondispersed system. The mean particle diameter of the polyamic acid microfine particles recovered was 58 nm.

One gram of the recovered polyamic acid microfine particles was dispersed in 200 ml of xylene and the imidation reaction was carried out by refluxing the dispersion at 135° C. for about 4 hours. The resulting polyimide showed a Td value of 600° C. but showed neither Tg nor Tm. This polyimide was examined with a SEM. The mean particle diameter of these polyimide particles was 58 nm. Those results indicate that the product is straight-chain, non-thermoplastic polyimide consisting of uniform spherical microfine particles forming a monodispersed system.

Example 6

In the first place, a first solution of pyromellitic dianhydride/methyl acetate=0.002 mol/50 ml and a second solution of p-phenylenediamine/methyl acetate=0.002 mol/50 ml were respectively prepared.

The two solutions were combined at 25° C. and reacted under ultrasonic agitation at a frequency of 38 kHz for 10 minutes, whereupon the polyamic acid precipitated. The polyamic acid thus obtained was observed with a scanning electron microscope (SEM) and, as a result, it was confirmed to be uniform, spherical microfine particles forming a monodispersed system. The mean particle diameter of the polyamic acid microfine particles recovered was 35.5 nm.

One gram of the recovered polyamic acid microfine particles was dispersed in 200 ml of xylene and the imidation reaction was carried out by refluxing the dispersion at 135*C for about 4 hours. The resulting polyimide showed a Td value of 607° C. but showed neither Tg nor Tm. This polyimide was examined by SEM. The mean particle diameter of these polyimide particles was 35.5 nm. Those results indicate that the product is straight-chain non-thermoplastic polyimide consisting of uniform spherical, microfine particles forming a monodispersed system.

Example 7

In the first place, a first solution of BTDA/acetone=0.002 mol/50 ml and a second solution of p-phenylenediamine/acetone=0.002 mol/50 ml were respectively prepared.

The two solutions were combined at 25° C. and reacted under ultrasonic agitation at a frequency of 38 kHz for 10 minutes, whereupon the polyamic acid precipitated. The polyamic acid thus obtained was observed with a scanning electron microscope (SEM) and, as a result, it was confirmed to be uniform, spherical microfine particles forming a monodispersed system. The polyamic acid microfine particles had a mean particle diameter of 0.243 μm with a standard deviation of 0.0199, the coefficient of variation being 8.18%.

One gram of the recovered polyamic acid microfine particles was dispersed in 200 ml of xylene and the imidation reaction was carried out by refluxing the dispersion at 135° C. for about 4 hours. The resulting polyimide showed a Td value of 550° C. but showed neither Tg nor Tm. The polyimide was examined with a SEM. It was confirmed to be uniform, spherical microfine particles forming a monodispersed system. The polyimide microfine particles had a mean particle diameter of 0.242 μm with a standard deviation of 0.0146, the coefficient of variation being 6.03%. Those results indicate that the product is straight-chain, non-thermoplastic polyimide consisting of uniform, spherical microfine particles forming a monodispersed system.

Example 8

In the first place, a first solution of pyromellitic dianhydride/acetone=0.002 mol/50 ml and a second solution of 4,4'-diaminodiphenyl sulfide/acetone=0.002 mol/50 ml were respectively prepared.

The two solutions were combined at 25° C. and reacted under ultrasonic agitation at a frequency of 38 kHz for 10 minutes, whereupon the polyamic acid precipitated. The polyamic acid thus obtained was observed with a scanning electron microscope (SEM) and, as a result, it was confirmed to be uniform, spherical microfine particles forming a monodispersed system. The polyamic acid microfine particles had a mean particle diameter of 0.535 μm with a standard deviation of 0.0306, the coefficient of variation being 5.72%.

One gram of the recovered polyamic acid microfine particles was dispersed in 200 ml of xylene and the imidation reaction was carried out by refluxing the dispersion at 135° C. for about 4 hours. The resulting polyimide showed a Td value of 565° C. but showed neither Tg nor Tm. This polyimide was examined with a SEM. The polyimide particles had a mean particle diameter of 0.549 μm with a standard deviation of 0.0324, the coefficient of variation being 5.91%. Those results indicate that the product is straight-chain, non-thermoplastic polyimide consisting of uniform, spherical microfine particles forming a monodispersed system.

What is claimed is:

1. A process for producing polyamic acid microfine particles from a tetracarboxylic anhydride and a diamine compound which comprises
    (a) a first step which comprises preparing a first solution containing said tetracarboxylic anhydride and a second solution containing said diamine compound and
    (b) a second step which comprises mixing said first and second solutions and causing polyamic acid to precipitate under ultrasonic agitation in the form of microfine particles from the mixed solution.

2. A process for producing polyimide microfine particles from a tetracarboxylic anhydride and a diamine compound which comprises
    (a) a first step which comprises preparing a first solution containing said tetracarboxylic anhydride and a second solution containing said diamine compound,
    (b) a second step which comprises mixing said first and second solutions and causing polyamic acid to precipitate under ultrasonic agitation in the form of microfine particles from the mixed solution, and
    (c) a third step which comprises subjecting said polyamic acid microfine particles to imidation reaction to thereby produce polyimide microfine particles.

3. The process for producing polyamic acid microfine particles as claimed in claim 1 wherein the solvent of said first solution comprises at least one member selected from the group consisting of 2-propanone, 3-pentanone, tetrahydropyrene, epichlorohydrin, acetone, methyl ethyl ketone, tetrahydrofuran, ethyl acetate, acetanilide, methanol, ethanol and isopropyl alcohol.

4. The process for producing polyimide microfine particles as claimed in claim 2 wherein the solvent of said first solution comprises at least one member selected from the group consisting of 2-propanone, 3-pentanone, tetrahydropyrene, epichlorohydrin, acetone, methyl ethyl ketone, tetrahydrofuran, ethyl acetate, acetanilide, methanol, ethanol and isopropyl alcohol.

5. The process for producing polyamic acid microfine particles as claimed in claim 1 wherein the solvent of said second solution comprises at least one member selected from the group consisting of 2-propanone, 3-pentanone, tetrahydropyrene, epichlorohydrin, acetone, methyl ethyl ketone, tetrahydrofuran, ethyl acetate, acetanilide, methanol, ethanol and isopropyl alcohol.

6. The process for producing polyimide microfine particles as claimed in claim 2 wherein the solvent of said second solution comprises at least one member selected from the group consisting of 2-propanone, 3-pentanone, tetrahydropyrene, epichlorohydrin, acetone, methyl ethyl ketone, tetrahydrofuran, ethyl acetate, acetanilide, methanol, ethanol and isopropyl alcohol.

7. The process for producing polyimide microfine particles as claimed in claim 2 wherein, in said third step, the polyamic acid microfine particles are heated in an organic solvent for imidation.

8. The process for producing polyimide microfine particles as claimed in claim 2 wherein, in said third step, the polyamic acid microfine particles are heated in a solvent comprising an organic solvent forming an azeotropic mixture with water for imidation with the byproduct water being constantly removed azeotropically.

9. The process for producing polyimide microfine particles as claimed in claim 7 or 8 wherein the heating in the solvent in said third step is performed at 130–250° C.

10. The process for producing polyamic acid microfine particles as claimed in claim 1, 3 or 5 wherein said tetracarboxylic anhydride and diamine compound are used in such a combination that the polyimide microfine particles available from the polyamic acid microfine particles will show neither a glass transition temperature nor a melting temperature.

11. The process for producing polyimide microfine particles as claimed in claim 2, 4 or 7 wherein said tetracarboxylic anhydride and diamine compound are used in such a combination that the polyimide microfine particles will show neither a glass transition temperature nor a melting temperature.

12. Polyamic acid microfine particles as derived from the process claimed in claim 1, 3 or 5, which have a mean particle diameter of 0.03–0.7 $\mu$m, a standard deviation of 0.02–0.07 and a coefficient of variation within the range of 3–15%.

13. Polyamic acid microfine particles as derived from the process claimed in claim 2, 4, 6 or 7, which have a mean particle diameter of 0.03–0.7 $\mu$m, a standard deviation of 0.02–0.07 and a coefficient of variation within the range of 3–15%.

14. Straight-chain, non-thermoplastic polyimide microfine particles as derived from the process of claim 2, 4, 6 or 7 using such a combination of tetracarboxylic anhydride and diamine compound that the polyimide microfine particles have neither a glass transition temperature nor a melting temperature, which straight-chain, non-thermoplastic polyimide microfine particles have a mean particle diameter of 0.03–0.7 $\mu$m, a standard deviation of 0.02–0.07 and a coefficient of variation within the range of 3–15%.

* * * * *